Patented June 20, 1950

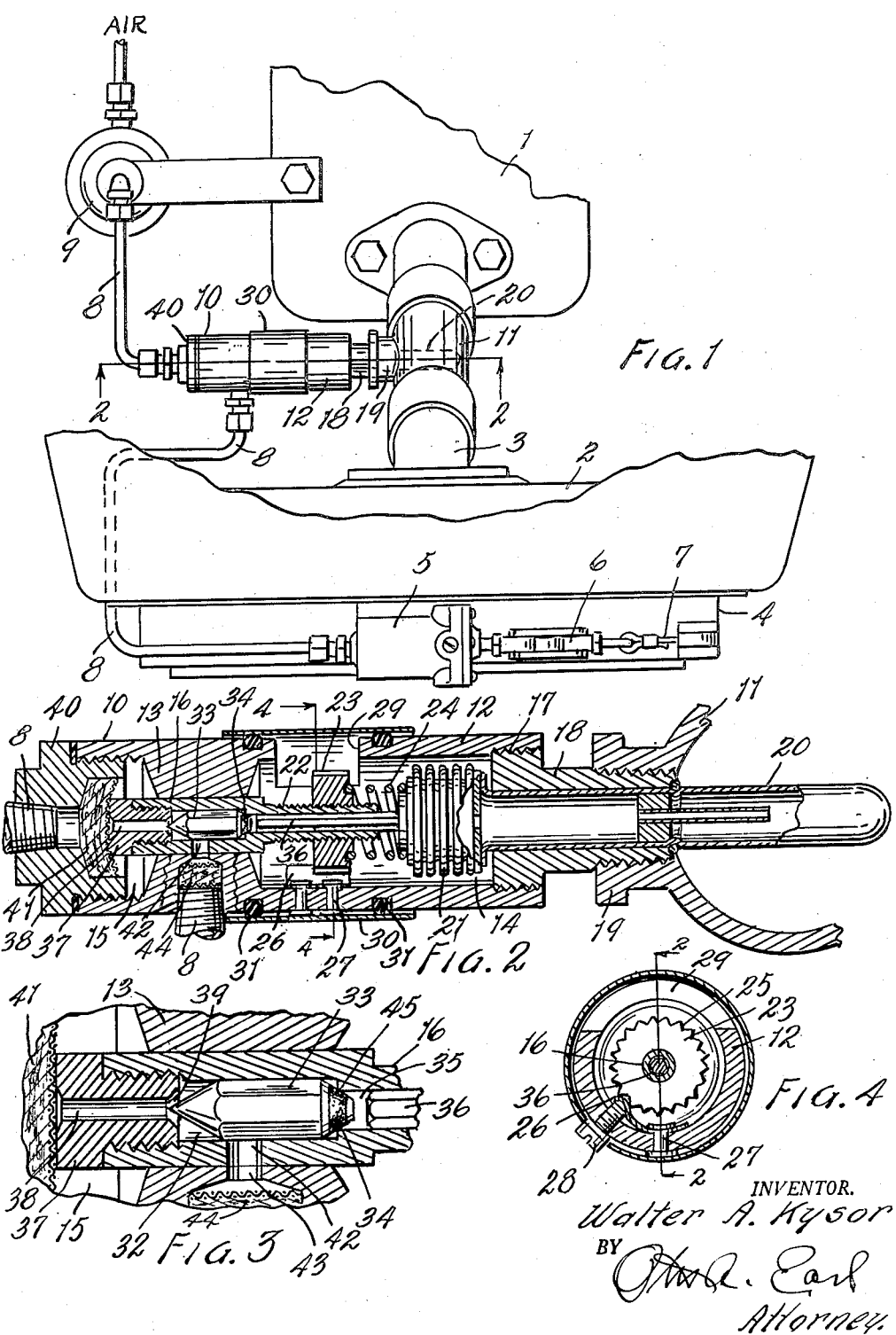

2,512,548

UNITED STATES PATENT OFFICE 2,512,548

THERMOSTATIC CONTROL VALVE

Walter A. Kysor, Cadillac, Mich., assignor to Kysor Heater Company, Cadillac, Mich.

Application March 4, 1949, Serial No. 79,669

2 Claims. (Cl. 236—99)

This invention relates to improvements in thermostatic control valve and particularly to the control valve of automatic shutter control mechanism for automotive radiators such as disclosed in my patent entitled Shutter Mechanism and Thermostatic Control Therefor, Number 2,248,094, issued July 8, 1941.

The principal objects of this invention are:

First, to provide a thermostatic control valve assembly which is easily adjusted without the use of wrenches.

Second, to provide a control valve assembly which is effectively shielded from dust and dirt.

Third, to provide a control valve assembly which is easily removable from an engine for repair or adjustment of the valve without draining the cooling fluid from the engine.

Fourth, to provide a control valve with a positively sealing valve.

Other objects and advantages relating to details of my invention will be apparent from a consideration of the following description and claims.

The drawings, of which there is one sheet, illustrate a preferred form of my valve.

Fig. 1 is a fragmentary plan view of an automobile engine and radiator illustrating my thermostatic valve operatively conected with shutter mechanism associated with the radiator.

Fig. 2 is a cross sectional view through the thermostatic valve taken along the plane of the line 2—2 of Fig. 1, the outlet connection to the valve being angularly displaced from its position in Fig. 1 to appear in Fig. 2.

Fig. 3 is an enlarged fragmentary cross sectional view illustrating in greater detail the construction of the valve member and valve seat shown in Fig. 2.

Fig. 4 is a transverse cross sectional view through the valve assembly taken along the plane of the line 4—4 of Fig. 2.

In Fig. 1, I have illustrated an internal combustion engine 1 provided with a radiator 2 and an outlet connection 3 from the engine to the radiator. Mounted on the front or inlet side of the radiator is a shutter assembly indicated generally at 4. The shutter mechanism is preferably the same as that described in my previously mentioned patent in which a series of shutter vanes, not illustrated herein, are actuated by an air cylinder 5 operating through a lever 6 and cable 7. The air cylinder 5 is supplied with compressed air through the conduit 8 and filter 9 from a suitable source in the vehicle. The passage of air through the conduit 8 is controlled by my thermostatically controlled valve generally indicated at 10 and interposed between two sections of the conduit 8. The valve assembly 10 is connected to a section 11 of the cooling fluid pipe 3 to be responsive to the temperature of the engine cooling fluid in a manner to be more particularly described.

The valve assembly 10 consists of a generally hollow cylindrical body 12 having a partition 13 formed intermediate of its ends. The interior of the body 12 is thus divided into a bellows chamber 14 and an inlet chamber 15. The partition 13 is bored axially of the body to receive the valve housing 16 which projects into both the bellows chamber and inlet chamber.

The open end of the bellows chamber 14 is internally threaded as at 17 to engage the threaded shoulder on a coupling member 18 and the coupling member is in turn threadedly engaged with a T 19 formed on the intermediate section 11 of the cooling fluid outlet from the engine. The coupling 18 is internally bored and carries a thermostatic bulb 20 projecting into the cooling fluid passage at one end and connected to an expansible bellows 21 within the bellows chamber of the valve body. The function of the bulb 20 and bellows 21 is the same as the similar elements of my previously mentioned patent to effect expansion and elongation of the bellows upon an increase in the temperature of the cooling fluid flowing over the end of the bulb 20.

The end of the valve housing 16, which projects into the bellows chamber, is externally threaded as at 22 and forms an adjustable support for the control wheel 23. A spring 24 is compressed between the wheel 23 and bellows 21 to resist the expanding motion of the bellows. By moving the wheel 23 along the threaded portion of the valve housing, the ability of the bellows to expand can be adjusted.

The periphery of the wheel 23 is notched as at 25 so that the wheel can be readily turned with the fingers and to provide notches for receiving the spring detent or holding finger 26. The finger 26 is secured to the inner surface of the bellows chamber by a rivet 27. A screw 28 extending into the bellows chamber from the outside of the valve body (see Fig. 4) is operative to force the finger into locking engagement with the wheel. The wall of the bellows chamber is cut away in an arcuate slot 29 opposite the wheel 23 and spring finger 26 to provide access to the adjusting wheel. The slot 29 is closed against the entrance of dirt and dust by a tubular cylindrical shield 30 fitted around the valve body 12. The shield 30 is held in place axially by the head of the screw 28 and rubber rings 31 are mounted around the body 12 to seal the sleeve to the body. A small vent opening from within the bellows chamber 14 is provided where the screw 28 passes through the shield 30.

The valve housing 16 is axially bored to form a valve chamber 32 within which the octagonal valve member 33 is reciprocable. The right end of the valve 33, as viewed in Figs. 2 and 3, is provided with a truncated end cooperative with the exhaust valve seat 34 formed in the bore of the valve housing. The valve chamber 32 communicates with an exhaust passage 35 when the exhaust valve is open, the exhaust passage extending through the threaded portion 22 of the valve housing into the bellows chamber 14. Positioned within the exhaust passage 35 is a push pin 36 engageable between the opposed ends of the valve member 33 and bellows 21. The push pin 36 is of non-circular cross section, as is most clearly shown in Figs. 3 and 4, and is operative to unseat the exhaust valve upon expansion of the bellows 21 while permitting the passage of air through the passage 35.

The left end of the valve housing 16, as illustrated in Figs. 2 and 3, is internally threaded to receive the nipple 37. The nipple is axially bored forming an inlet passage 38 and the inner end of the passage serves as an inlet valve seat 39. The left end of the valve member 33 is conical shaped to seat against the valve seat 39.

The inlet chamber 15 of the valve body is internally threaded to receive the coupling 40 by means of which the end of one portion of the conduit 8 is connected to the valve assembly. The coupling 40 is recessed to receive a pad of filtering material 41 and clamp it against the inlet end of the nipple 37.

The partition 13 of the valve body is provided with a radially extending bore 43 communicating with the valve chamber 32 through a bore 42 in the valve housing 16. The bore 43 is threaded to receive the outlet section of the conduit 8 and is preferably provided with a pad of filtering material 44. Obviously the octagonal shape of the valve member 33 will permit the passage of air from the inlet passage 38 along the sides of the valve member to the outlet passages 42 and 43 and also to the exhaust passage 35 until the exhaust valve 34 is closed. To assure positive closing of the exhaust passage, the exhaust valve portion of the valve member 33 is provided with a rubber or similar deformable collar 45.

The valve assembly as a whole operates in the same manner as my previously mentioned patented valve, the valve member 33 being closed upon the inlet valve seat 39 by expansion of the bellows 21 and opened, when the bellows retracts from the push pin 36, by the impact of air flowing around the valve member and out of the exhaust passage 35.

Particular attention is called to the fact that the valve assembly is readily adjusted by simply removing the screw 28 and sliding the shield 30 axially to uncover the opening 29. The wheel 23 can be adjusted with the fingers and no wrenches are necessary. Attention is further called to the fact that the valve body 12 is easily removed at the threaded connection 17 from the coupling 18 so that the cooling fluid need not be drained from the engine in order to remove the valve assembly for cleaning or repair of its parts.

Having thus described my invention, what I claim as new and desire to secure by Letters Patent is:

1. A thermostatic valve assembly comprising a cylindrical body member having a bellows chamber formed in one end thereof and an inlet chamber formed in the other end thereof, a partition between said chambers, a valve housing extending through said partition and into each chamber, the end of said housing within said bellows chamber being externally threaded, a coupling member threadedly engaged with the end of said bellows chamber and having its opposite end threaded for engagement in the wall of a conduit, heat responsive means projecting from each end of said coupling member and including an expansible bellows positioned within said bellows chamber and opposed to the end of said valve housing, an adjusting hand wheel having a notched periphery and threadedly engaged on the threaded portion of said valve housing, a spring compressed between said bellows and said adjusting wheel, the wall of said bellows chamber forming an opening opposite said adjusting wheel, a sleeve slidably mounted around said body and adapted to close said opening in said bellows chamber wall, dust sealing elements positioned around said body on each side of said opening and engageable with said sleeve, a screw extending through said sleeve and body in the closed position of said sleeve to retain said sleeve in closed position, a valve chamber formed in said valve housing and having a double acting valve member of non-circular cross section positioned therein, an inlet passage and an exhaust passage axially aligned and communicating with opposite ends of said valve chamber in said valve housing, a push pin positioned in said exhaust passage and operative between said bellows and said valve member to move said valve member toward said inlet passage upon expansion of said bellows, a nipple threaded into said inlet passage and having a bore and valve seat cooperative with said valve member, an outlet passage from said valve chamber formed in said valve housing and said partition and communicating through said valve chamber alternatively with said inlet passage or said exhaust passage depending upon the position of said valve member, and a springable lock member secured to the wall of said bellows chamber and having a finger engageable with the notched periphery of said wheel to hold said wheel in adjusted position, said screw being engageable with said lock member to hold said finger in locking position.

2. A thermostatic valve structure comprising an elongated body member forming a bellows chamber in one end thereof and an inlet chamber in the opposite end thereof, valve mechanism positioned in said body and extending between said chambers, a heat responsive element threadedly secured to one end of said body and projecting into said bellows chamber, said heat responsive mechanism including a bellows adapted to actuate said valve mechanism, an adjusting wheel threadedly supported on said valve mechanism within said bellows chamber, a spring compressed between said bellows and said adjusting wheel to oppose the action of said bellows, the wall of said bellows chamber forming an arcuate opening opposite said adjusting wheel, a spring detent secured within said bellows chamber and engageable with said wheel to hold said wheel in adjusted position, a sleeve slidably fitted around said body to close said opening, dust sealing rings positioned around said body on each side of said opening and engageable with said sleeve, and removable screw means engageable between said sleeve and said body to prevent relative axial motion therebetween, said screw bearing against said detent to lock said wheel.

WALTER A. KYSOR.

REFERENCES CITED

The following references are of record in the file of this patent:

UNITED STATES PATENTS

| Number | Name | Date |
|---|---|---|
| 1,251,214 | Fulton | Dec. 25, 1917 |
| 1,540,035 | Roesch | June 2, 1925 |
| 2,095,357 | Dube | Oct. 12, 1937 |
| 2,248,094 | Kysor | July 8, 1941 |